Nov. 7, 1961    D. W. SCHLICHER    3,008,082
VOLTAGE REGULATOR FOR GENERATORS
Filed Oct. 27, 1960
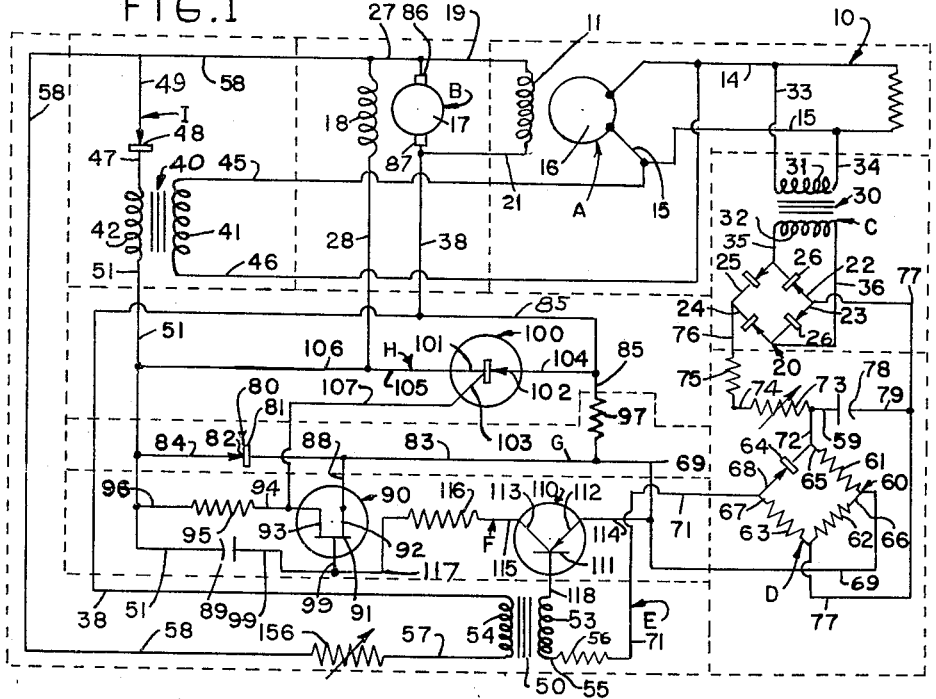
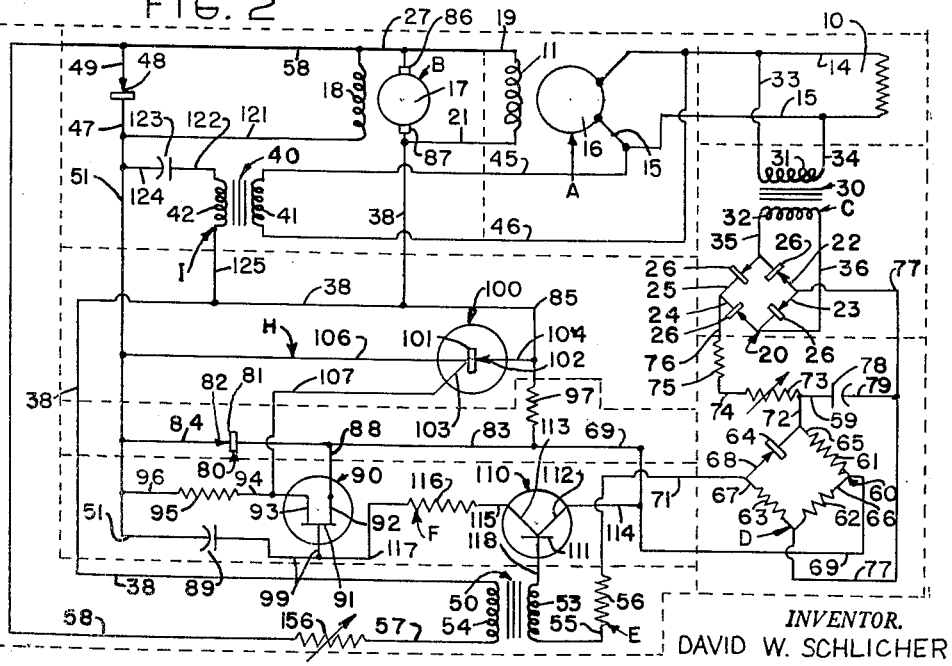
INVENTOR.
DAVID W. SCHLICHER
BY
Akel C. Benson
ATTORNEY

United States Patent Office 3,008,082
Patented Nov. 7, 1961

3,008,082
VOLTAGE REGULATOR FOR GENERATORS
David W. Schlicher, Minneapolis, Minn., assignor to Electric Machinery Mfg. Company, Minneapolis, Minn., a corporation of Minnesota
Filed Oct. 27, 1960, Ser. No. 65,307
13 Claims. (Cl. 322—28)

The herein disclosed invention relates to voltage regulators and has for an object to provide a voltage regulator in which the response is extremely rapid and positive.

Another object of the invention resides in providing a voltage regulator having no moving parts.

A still further object of the invention resides in providing a voltage regulator for regulating the voltage of a generator having a field winding and an exciter therefor and in utilizing a silicon controlled rectifier for varying the output of the exciter to maintain the desired voltage.

Another object of the invention resides in providing a firing circuit utilizing a silicon unijunction transistor functioning as an oscillator and serving to fire the silicon controlled rectifier.

An object of the invention resides in providing a transistor in said firing circuit actuating said silicon unijunction transistor and associated with timing means for causing the silicon controlled rectifier to fire at various times during the pulse cycle.

Another object of the invention resides in providing a sensing circuit including a bridge energized from the power circuit.

A still further object of the invention resides in providing a stabilizing circuit to maintain closed-loop stability.

An object of the invention resides in providing a circuit to turn off the silicon controlled rectifier at regular intervals.

Another object of the invention resides in providing a voltage regulator adapted to be used with either single-phase or polyphase generators.

Other objects of the invention reside in the novel combination and arrangement of the parts herein after illustrated and/or described.

In the drawings:

FIGURE 1 is a wiring diagram of an alternating current generator and a voltage regulator therefor illustrating an embodiment of the invention.

FIGURE 2 is a wiring diagram similar to FIGURE 1 and showing a modification of the invention.

In the drawings a generator A is shown which derives its field excitation from a rotary exciter B. A power circuit C includes a bridge rectifier, which provides current for actuating a sensing circuit D. The sensing circuit D produces an error signal which provides the control current for a firing circuit F. A stabilizing circuit E which is energized by the exciter output modifies this control current, whenever the exciter voltage is changing, in such a direction as to oppose the change and thus provides stable operation. A voltage-shaping circuit G provides a regulated pulse voltage to energize a firing circuit F once during each cycle of the generator frequency. Firing pulses from circuit F actuate a primary field winding circuit H energized by the exciter B and which compensates for voltage variation at the generator A and brings voltage to the proper value. A secondary field winding circuit I provides part of the field excitation for exciter B and also restores circuit H to a non-conducting state once each cycle.

The generator A includes a field winding 11 and an output circuit 16 which deliver electrical energy to a power line 10 having two conductors 14 and 15.

Excitation for the field winding 11 is procured from the rotary exciter B which has a rotor 17 and a field winding 18. The rotor 17 has terminals 86 and 87 which are directly connected to the field winding 11 of generator A by means of two conductors 19 and 21. The field winding 18 of exciter B is connected at one end by means of a conductor 27 to the terminal 86 and has a conductor 28 connected to it at its other end, the use of which will be subsequently described in detail.

The power circuit C includes a bridge rectifier 20 which has four legs 22, 23, 24 and 25 and in which there are connected individual rectifiers 26. In conjunction therewith a transformer 30 is employed which has a primary 31 and a secondary 32. The primary 31 is connected by means of conductors 33 and 34 to the conductors 14 and 15 of line 10. One end of the secondary 32 of said transformer is connected by means of a conductor 35 with the juncture of legs 22 and 25 of bridge 20 and the other end of said secondary is connected by means of a conductor 36 to the juncture between the legs 23 and 24 of said bridge.

The sensing circuit D includes three resistors 61, 62 and 63 and a Zener diode 64 which are connected in the legs 65, 66 and 67 and 68 of a bridge circuit 60. The juncture between the legs 65 and 66 is connected to a conductor 69 which forms one of the output conductors of the bridge. The juncture between the legs 67 and 68 is connected to a conductor 71, which forms the other output conductor of the bridge. The juncture between the legs 65 and 68 is connected to a conductor 72, which forms one of the input conductors to the bridge and which is connected to a variable resistor 73. This resistor is connected by means of a conductor 74 to a fixed resistor 75, which in turn is connected to the juncture between the legs 24 and 25 of the bridge rectifier 20 by means of a conductor 76. The juncture between the legs 66 and 67 is connected by means of a conductor 77 to the juncture between the legs 22 and 23 of the bridge rectifier 20. A condenser 78 is connected by means of conductors 79 and 59 to the conductors 72 and 77.

The stabilizing circuit E includes a transformer 50, having a primary 54 and a secondary 53. One end of the secondary 53 is connected by means of a conductor 55 to a resistor 56. This resistor is connected directly to the conductor 71, previously referred to. One end of the primary 54 of said transformer is connected to a variable resistor 156 by means of a conductor 57. This resistor is directly connected to the conductor 27 and to field winding 18 by means of a conductor 58. The other end of the primary 54 is connected by means of a conductor 38 to the terminal 87 of exciter B.

The voltage shaping circuit G utilizes a voltage dropping resistor 97, which has connected to it at one end the conductor 69 leading from the juncture between the legs 65 and 66 of the bridge 60. The other end of said resistor is connected by means of a conductor 85 to the conductor 38 and which is connected to the terminal 87 of exciter B. The cathode 81 of a Zener diode 80 is connected by means of a conductor 83 to the conductor 69, while the anode 82 of this diode is connected by means of a conductor 84 to a conductor 51.

The firing circuit F utilizes a silicon unijunction transistor 90 having an emitter 91, a first base 93, and a second base 92. Base 93 is connected by means of a conductor 94 to a dropping resistor 95, which is connected by means of a conductor 96 to the conductor 51. Base 92 is connected to conductor 83 by means of a conductor 88. Emitter 91 is connected by means of a conductor 99 to a condenser 89 which in turn is connected to the conductor 51. The unijunction transister 90 functions as a relaxation oscillator, the frequency of which is determined, as will be presently described.

The firing circuit F further utilizes a transistor 110 having a base 111, an emitter 112, and a collector 113. Emitter 112 is connected by means of a conductor 114 to conductor 69. Collector 113 is connected by means of a conductor 115 to a resistor 116, which in turn is connected by means of a conductor 117 to a conductor 99. Base 111 is connected by means of a conductor 118 to the secondary 53 of transformer 50. The resistor 116 and the condenser 89 serve as timing means, a charge of electricity building up in condenser 89 from the current flowing through the transistor 110.

The adjusting circuit H is built around a silicon controlled rectifier 100 having a cathode 101, an anode 102, and a gate 103. The anode is connected by means of a conductor 104 to conductor 85. The cathode 101 is connected by means of a conductor 105 to the conductor 28. To the conductor 28, is connected a conductor 106, which in turn is connected to conductor 51 and thus to the secondary 42 of a transformer 40, forming part of the restoring circuit I. A conductor 107 extends between the gate 103 of rectifier 100 and the conductor 94.

The restoring circuit I includes a source of alternating current produced by the transformer 40 which has a primary 41 and a secondary 42. Primary 41 is connected by means of conductors 45 and 46 to the conductors 14 and 15 of line 10. Conductor 51, previously referred to, is connected to one end of the secondary 42 while the other end is connected by means of a conductor 47 to a rectifier 48 which in turn is connected by means of a conductor 49 to conductor 58.

The field winding 18 is fed by means of the main field winding circuit H and the auxiliary field winding circuit I. Circuit H includes conductor 27, terminal 86, exciter B, terminal 87, conductors 38, 85 and 104, rectifier 100, conductors 105 and 28. Circuit I includes conductors 58 and 49, rectifier 48, conductor 47, secondary 42 of transformer 40 and conductors 51, 106 and 28.

The operation of the invention is as follows:

Assume that a drop in line voltage has occurred either by loading the line or otherwise, and it is desired to bring the voltage up to normal. In such case the following phenomena take place. Bridge rectifier 20 produces a full wave rectified voltage, consisting of sine wave pulses all of the same polarity. These pulses are impressed on the bridge circuit 60. Resistors 75 and 73 and condenser 78 filter out the ripples and produce substantially uniform direct current. Under the conditions named, this voltage is below the break down voltage of the Zener diode 64 and current flows through the legs 65, 66 and 67 of said bridge, the Zener diode 64 blocking flow through the leg 68. This sets up a positive bias potential between conductors 69 and 61. Control current for operating transistor 110 is derived from bridge 60 and flows through conductors 69 and 114, emitter 112 and base 111 of said transistor, conductor 118, secondary 53 of transformer 50, conductor 55, resistor 56 and conductor 71. This causes current to flow from terminal 87 through conductors 38 and 85, resistor 97, conductors 69 and 114, transistor 110, conductor 115, resistor 116 and through conductor 117. The current from conductor 117 has two possible parallel paths, one through transistor 90 and the other through condenser 89. As long as the voltage across emitter 91 and base 93 of transistor 90 is less than the peak point voltage of said transistor, the transistor will not conduct and the current flows from conductors 117 and 99 through to condenser 89, conductors 51, 106 and 28, field winding 18, and conductor 27 to terminal 86, charging said condenser. This continues until the voltage across conductors 99 and 51 reaches the peak point voltages of transistor 90, causing said transistor to fire. The current from condenser 89 then discharges through a circuit including said condenser, conductor 99, emitter 91 and base 93 of transistor 90, conductor 94, resistor 95, and conductors 96 and 51 back to said condenser. At the same time, the discharge current from condenser 89 places a voltage across gate 103 and cathode 101 of rectifier 100 by way of a parallel circuit including conductor 99, transistor 90, conductor 107, gate 103, cathode 101 of said silicon controlled rectifier 100, and conductors 105, 106 and 51 back to condenser 89. This fires rectifier 100. Current now flows through primary field winding circuit H which includes terminal 87 of exciter B, conductors 38, 85 and 104, anode 102 and cathode 101 of rectifier 100, conductors 105 and 28, field winding 18 and conductor 27 back to terminal 86 of exciter B. It will be noted that auxiliary field winding circuit I including conductor 49, rectifier 48, the secondary 42 of transformer 40 and conductors 51 and 106 is in parallel with the circuit H through rectifier 100, both tending to energize field winding 18. Rectifier 48 limits flow of current through the field winding 18 to the same direction as the current from rectifier 100. Due to the fact that rectifier 48 is a half wave rectifier, it produces spaced pulses of the same polarity. When the voltage of one of these pulses exceeds the voltage of the exciter, the voltage across the cathode 101 and anode 102 of rectifier 100 drops to a certain low value due to the fact that the voltage due to transformer 40 is of the opposite polarity; and the rectifier is shut off and flow of current through it ceases. The field winding 18 is then being fed solely from transformer 40. As soon as the voltage derived from secondary 42 of transformer 40 decays sufficiently, the voltage from conductor 51 to conductor 69 builds up again. As long as the voltage from secondary 42 of transformer 40 exceeds the exciter voltage, the voltage from conductor 51 to 69 is essentially zero, due to the fact that the transformer voltage is of opposite polarity to that of the exciter, and current flows in the forward direction through Zener diode 80. Transistor 110 hence has no collector to emitter voltage and does not pass current. Capaciter 89 therefore is not charged. When, however, the voltage of transformer 40 decays sufficiently, the exciter voltage prevails and the voltage from conductors 51 to 69 again builds up, and condenser 89 is again charged, producing a pulse firing rectifier 100. While the rectifier 100 is firing, the voltage between conductor 51 and 69 is extremely low so that there is insufficient current flowing to charge up the capacitor 89 and produce another firing pulse. Since rectifier 48 produces only half wave rectification, there are time spaces in between the sine wave pulses produced by transformer 40 in which the rectifier 100 can operate. The sum of the two series of pulses thus provides the field current for field winding 18. It will readily be comprehended that the duration of the pulse produced by rectifier 100 will determine the value of the field current. If the voltage across the Zener diode 64 is below the break-down voltage, current flows through 110 and condenser 89 charges. The pulses produced by rectifier 100 then increase the excitation of said exciter, which in turn increases the voltage of generator A and the voltage across the conductors 76 and 77. When such voltage reaches the break-down voltage of Zener diode 64, the same fires and the voltage across conductors 69—71 drops. The transistor 110 now passes less current and condenser 89 charges more slowly, and a longer time elapses before the condenser can fire rectifier 100. The pulse produced thereby is hence shorter. The rate of increase in field excitation current is hence less and the result and output voltage increases at a low rate. It is a well-known fact that after break-down voltage is reached, the internal resistance of the Zener diode varies greatly with slight variations of voltage. The components are so selected that regulation is procured after the Zener diode has fired. Thus, if the change in output voltage is great, the excitation current builds up rapidly until the desired voltage is substantially reached and thereafter slight variations in output voltage product great changes in field current and correspondingly more accurate regulation.

In FIGURE 2 a modification of the invention has been shown. In this figure considerable of the structure shown is identical to that illustrated in FIGURE 1 and the description thereof will not be repeated and the same reference characters will be used to identify the identical parts.

In the form of the invention shown in FIGURE 2, the field coil 18 of exciter B is connected by means of the conductor 27 to the terminal 86 of said exciter and also by the conductors 58 and 49 to the rectifier 48. The other end of said field coil is connected by means of a conductor 121 to the conductor 51 which in turn is connected to the rectifier 48 by means of a conductor 47. The primary 41 of transformer 40 is connected in the same manner as shown in FIGURE 1 by means of conductors 45 and 46 to the conductors 14 and 15 of line 10. The secondary 42 of this transformer is connected by means of a conductor 122 to a condenser 123 which in turn is connected by means of a conductor 124 to the conductor 51. The other side of the secondary 42 of the transformer 40 is connected by means of a conductor 125 to the conductor 38.

The method of operation for the form of the invention shown in FIGURE 2 is the same as that shown in FIGURE 1 with the exception of the auxiliary field winding circuit I which functions in the following manner: With a positive pulse being produced by the secondary 42 of transformer 40, current flows through the auxiliary field circuit I. This circuit comprises conductor 122, condenser 123, conductors 124, 51, and 121, field winding 18, conductor 27, terminal 86, exciter B, terminal 87 and conductors 38 and 125. The field winding 18 is, during this period, energized both from the transformer 40 and from the exciter B, the secondary of said transformer and the exciter being connected in series in this circuit. During this pulse the voltage across the anode to cathode of the silicon controlled rectifier 100 is opposite in polarity to that required for the functioning of said rectifier, said rectifier being connected across secondary 42 of transformer 40 and condenser 123 and energized solely thereby. Rectifier 100 hence does not function during this pulse. Likewise transistors 110 and 90 do not function as the voltage between conductors 51 and 69 is only the forward drop of Zener diode 80 and is of the wrong polarity. When the voltage of transformer 40 reverses, the polarity of the voltages across rectifier 100 and transistors 110 and 90 is proper and the same can now function as determined by the signal from sensing bridge 60.

The negative pulse from transformer 40 opposes the voltage from exciter B and during the interval before rectifier 100 fires, the energy stored in the field winding 18 discharges through the circuit comprising conductors 58 and 49, rectifier 48, conductors 47 and 121 and hence current still flows through the field winding.

The bridge 60 at all times furnishes control voltage for transistor 110 and this transistor now conducts. Condenser 89 is now being charged, as previously explained in conjunction with the form of the invention shown in FIGURE 1 and when the voltage across the same is sufficiently high, it fires the silicon unijunction transistor 90. This produces a pulse, firing the silicon controlled rectifier 100 and the same passes current through the primary field winding circuit H. This circuit includes terminal 87 of exciter B, conductors 38, 85 a nd 104, the output elements of rectifier 100, conductors 106, 51 and 121, field winding 18, conductor 27, and terminal 86 of exciter B. Current from the exciter now passes through the field winding and the same is solely energized thereby. This current continues until the current from transformer 40 reverses and produces a positive pulse, which restores rectifier 100 to the non-firing condition. Also during the firing period of rectifier 100, condenser 123 discharges through the circuit consisting of conductor 122, secondary 42 of transformer 40, conductors 125, 38, 85 and 104, rectifier 100, conductors 106, 51 and 124. This allows condenser 123 to recharge during the next positive pulse.

Applicant has found that the following list of components are suitable for producing the desired results with a 62.5 volt exciter:

B. Exciter 62.5 volts, 1000 watts

26. Selenium rectifier, 40 volts 100 ma.
30. Transformer, primary generator voltage, secondary 34 volts
40. Transformer, primary generator voltage, secondary 80 volts
48. Rectifier IN538
50. Transformer, primary 8000 turns, secondary 800 turns, core 1 inch square
56. Resistor 2,000 ohms, 2 watts
61. Resistor 1,000 ohms, 2 watts
62. Resistor 1,000 ohms, 2 watts
63. Resistor 1,000 ohms, 2 watts
64. Zener diode 6 volts, 1 watt
73. Variable resistor, 500 ohms, 4 watts
75. Resistor 1,000 ohms, 2 watts
78. Condenser 10 mf., 50 volts
80. Zener diode 27 volts, 1 watt
89. Condenser, .5 mf., 50 volts
90. Silicon unijunction transistor G.E. 2N489
95. Resistor 50 ohms, 2 watts
97. Resistor 2,500 ohms, 2 watts
100. Silicon controlled rectifier, G.E. C36
110. Transistor 2N525
116. Resistor 5,000 ohms, 2 watts
123. Condenser 500 mf., 100 volts
156. Variable resistor 10,000 ohms, 2 watts The advantages of the invention are manifest. The voltage regulator constituting the instant invention has no moving parts and does not require a great amount of energy to operate. By the use of semiconductors current consumption is a minimum. The invention operates very quickly so that a minimum change in voltage occurs when the loading of the circuit controlled is altered. The invention can be constructed at a reasonable expense and requires a minimum amount of attention or servicing.

While the invention has been illustrated for sake of simplicity, as applied to a single-phase generator, the same may also be applied to polyphase generators.

Having described the invention, what is claimed as new and desired to be protected by Letters Patent is:

1. In a voltage regulator for an electric generator having a field winding, sensing means responsive to changes in voltage of said generator and producing a control current, means energized from a source of alternating current and producing electric current pulses of the same polarity with time intervals there-between, means producing electric pulses of variable duration during the intervals between said first named pulses, means for energizing said field winding from both of said series of pulses and means actuated by the control current and responsive to changes in the generator voltage for varying the duration of said second named pulses to control the excitation of said field winding.

2. In a voltage regulator for an electric generator having a field winding, sensing means responsive to changes in voltage of said generator and producing a control current, a half-wave rectifier energized by a source of alternating current and producing electric current pulses of the same polarity with time intervals there-between, means producing electric pulses of variable duration during the intervals between said first named pulses, means for energizing said field winding from both of said series of pulses and means actuated by the control current and responsive to change in the generator voltage for varying the duration of said second named pulses to control the excitation of said field winding.

3. In a voltage regulator for an electric generator having a field winding, sensing means responsive to changes in voltage of said generator and producing a control current, a half-wave rectifier energized by a source of alternating current and producing electric current pulses of the same polarity with time intervals therebetween, a silicon controlled rectifier, means associated therewith and actuated by said control current and producing pulses of varying duration during the intervals between the first-named pulses, means for energizing said field winding from both of said series of pulses and means actuated by said control current and responsive to changes in the generator voltage for varying the duration of said second-named pulses to control the excitation of said field winding.

4. In a voltage regulator for an electric generator having a field winding, sensing means responsive to changes in voltage of said generator and producing a control current, a half-wave rectifier energized by a source of alternating current and producing electric current pulses of the same polarity with time intervals therebetween, a silicon unijunction transistor, a timing circuit associated therewith and responsive to said control current, said timing circuit controlling the firing of said transistor, a silicon controlled rectifier, said transistor serving to fire said rectifier at the end of the timing period produced by said timing circuit, said half-wave rectifier terminating the conducting of said silicon controlled rectifier at the beginning of said electric half-wave pulses to provide intervening pulses during the intervals between the half wave pulses, and means for energizing said field winding from both of said series of pulses.

5. In a voltage regulator for an electric generator having a field winding, sensing means responsive to changes in voltage of said generator and producing a control current, a half-wave rectifier energized by a source of alternating current and producing electric current pulses of the same polarity with time intervals therebetween, a silicon unijunction transistor, a timing circuit associated therewith and including a resistor and a condenser and providing energy for firing said silicon unijunction transistor, a silicon controlled rectifier, said timing circuit providing energy for controlling the firing of said silicon controlled rectifier upon firing of said silicon unijunction transistor and thereby producing pulses between the first-named pulses, means for energizing said field winding from both of said series of pulses and means actuated by the control current and responsive to changes in the generator voltage for varying the duration of said second-named pulses to control the excitation of said field winding.

6. In a voltage regulator for an electric generator having a field winding, sensing means responsive to changes in voltage of said generator and producing a control current, means energized from a source of alternating current and producing electric current pulses of the same polarity with time intervals therebetween, means for producing direct current for exciting said field winding, means for converting said direct current into pulses applied during said time intervals and means operable by said sensing means for varying the duration of said second-named pulses in accordance with the voltage changes of said generator.

7. In a voltage regulator for an electric generator having a generator field winding, an exciter for energizing said generator field winding and having an exciter field winding, sensing means responsive to changes in voltage of said generator output and producing a control current, a primary field excitation circuit for the field winding of said exciter energized from the output of said exciter, a secondary field excitation circuit for the field winding of said exciter energized by a source of electrical energy producing spaced electric pulses of the same polarity as the polarity of the exciter current, said excitation circuits being connected in parallel across said exciter field winding, said primary field winding circuit including means for producing electric pulses of variable duration during the intervals between pulses of said secondary exciter field excitation circuit and means actuated by control current and responsive to changes in generator voltage for varying the duration of said pulses of the primary excitation circuit to control the excitation of said field winding.

8. In a voltage regulator for an electric generator having a generator field winding, an exciter energizing said generator field winding and having an exciter field winding, sensing means responsive to changes in voltage of said generator output and producing a control current, a primary field excitation circuit for the field winding of said exciter energized from the output of said exciter, a secondary field excitation circuit for the field winding of said exciter energized by a source of electrical energy producing spaced electric pulses of the same polarity as the polarity of the exciter current, said excitation circuits being connected in parallel across said exciter field winding, a silicon controlled rectifier, said primary field winding including the cathode-anode circuit of said silicon controlled rectifier, means actuated by said control current and responsive to changes in the generator voltage for firing said silicon controlled rectifier to produce electric pulses of variable duration, during the intervals between pulses of said secondary excitation circuit, to control the excitation of said field winding.

9. In a voltage regulator for an electric generator having a generator field winding, an exciter for energizing said generator field winding and having an exciter field winding, sensing means responsive to changes in voltage of said generator output and producing a control current, a primary field excitation circuit for the field winding of said exciter energized from the output of said exciter, a transformer energized by a source of alternating current, a secondary field excitation source for the field winding of said exciter including the secondary of said transformer, a half-wave rectifier in said circuit producing spaced electric pulses of the same polarity as the polarity of the exciter current, said field excitation circuits being connected in parallel across said exciter field winding, a silicon controlled rectifier, said primary winding including the cathode-anode circuit of said silicon controlled rectifier and means actuated by said control current and responsive to changes in the voltage of said generator for firing said silicon controlled rectifier to produce electric pulses of variable duration, during the intervals between pulses of said secondary excitation circuit, to control the excitation of said field winding.

10. In a voltage regulator for an electric generator having a generator field winding, an exciter for energizing said generator field winding and having an exciter field winding, sensing means responsive to changes in voltage of said generator output and producing a control current, a primary excitation circuit for the field winding of said exciter energized from the output of said exciter, including a silicon controlled rectifier, a capacitor, a transformer energized from an alternating current source, a secondary field excitation source for the field winding of said exciter, including the secondary of said transformer, the armature of said exciter and said capacitor, said field excitation circuits being connected in parallel across said exciter field winding with said exciter armature being in common with both of said circuits, a rectifier connected across said exciter field winding to provide a discharge path for said exciter field current during intervals when no pulses are received from said primary and secondary excitation circuits, means actuated by said control current and responsive to changes in the voltage of said generator output to fire said silicon controlled rectifier and produce electric pulses of variable duration, during the intervals between pulses of said secondary excitation current, to control the excitation of said field winding.

11. In a voltage regulator for an electric generator having a generator field winding, an exciter for energizing said generator field winding and having an exciter field winding, sensing means responsive to changes in voltage of said generator output and producing a control current, a transistor having a control circuit and an output circuit, said control current energizing said control circuit of said transistor, a silicon unijunction transistor having a firing circuit including a condenser, the output circuit of said first named transistor charging said condenser, said condenser discharging through said firing circuit when the voltage across the transistor elements produced thereby reaches the peak point voltage of said transistor, a silicon controlled rectifier having a gate circuit connected to the firing circuit of said second-named transistor and energized by the charge in said condenser when said second-named transistor is fired, a primary field excitation circuit for the field winding of said exciter energized from the output of said exciter, a secondary field excitation circuit for the field winding of said exciter energized by a source of electrical energy producing spaced electric pulses of the same polarity as the polarity of the exciter current, said field excitation circuits being connected in parallel across said exciter field winding, said primary field winding circuit including the output elements of said rectifier, said first and second named transistors, and said silicon controlled rectifier deriving output voltage from the combined primary and secondary field excitation circuits and reaching a low potential at the end of one of said pulses and de-energizing said first and second named transistors and said rectifier and resetting the same for repeated operation following the next pulse.

12. In a voltage regulator for an electric generator having a generator field winding, an exciter for energizing said generator field winding and having an exciter field winding, sensing means responsive to changes in voltage of said generator output and producing a control current, a transistor having a control circuit and an output circuit, said control current energizing said control circuit of said transistor, a silicon unijunction transistor having a firing circuit including a condenser, the output circuit of said first named transistor charging said condenser, said condenser discharging through said firing circuit when the voltage across the transistor elements produced thereby reaches the peak point voltage of said transistor, a silicon controlled rectifier having a gate circuit connected to the firing circuit of said second named transistor and energized by the charge in said condenser when said second named transistor is fired, a primary field excitation circuit for the field winding of said exciter energized from the output of said exciter, a secondary field excitation circuit for the field winding of said exciter, including the secondary of a transformer energized by an alternating-current source, a half-way rectifier in said circuit producing spaced electric pulses of the same polarity as the polarity of the exciter current, said field excitation circuits being connected in parallel across said exciter field winding, said primary field winding circuit including the output elements of said rectifier, said first and second named transistors, and said silicon controlled rectifier deriving output voltage from the combined primary and secondary field excitation circuits and reaching a low potential at the end of one of said pulses and de-energizing said first and second named transistors and said rectifier and resetting the same for repeated operation following the next pulse.

13. In a voltage regulator for an electric generator having a field winding, sensing means responsive to changes in voltage of said generator and producing a control current, means energized from a source of alternating current and producing electric current pulses of the same polarity with time intervals therebetween, means for producing direct current for exciting said field winding, a silicon controlled rectifier, input and output circuits therefor, a silicon unijunction transistor, input and output circuits therefor, the output circuit of said silicon unijunction transistor energizing the input circuit of said silicon controlled rectifier, a timing circuit including a condenser and a resistor and connected to the input circuit of said silicon unijunction transistor and responsive to the current of said sensing means, said sensing means controlling the charging of said condenser and when the voltage across the same rises sufficiently, fires said silicon unijunction transistor which in turn fires said silicon controlled rectifier which energizes said field winding during the intervals between said pulses.

No references cited.